United States Patent [19]

Poirot

[11] 3,830,004

[45] Aug. 20, 1974

[54] FISHING NET

[76] Inventor: Eugene M. Poirot, Golden City, Mo. 64748

[22] Filed: Oct. 19, 1972

[21] Appl. No.: 299,087

[52] U.S. Cl............................. 43/4.5, 43/8, 43/14
[51] Int. Cl............................................ A01k 73/12
[58] Field of Search............ 43/14, 7, 8, 9, 105, 4.5

[56] References Cited
UNITED STATES PATENTS

| 124,635 | 3/1872 | Smith..................................... 43/14 |
| 528,350 | 10/1894 | Trouve................................... 43/8 |
| 1,585,483 | 5/1926 | Freer.................................. 43/14 X |
| 2,310,702 | 2/1943 | Ljubetich et al...................... 43/14 |
| 2,549,475 | 4/1951 | Jardim................................. 43/7 X |
| 2,663,117 | 12/1953 | Ederer............................... 43/14 X |
| 2,693,161 | 11/1954 | Stubbs............................... 43/14 X |
| 3,127,692 | 4/1964 | Adleberg........................... 43/14 X |

FOREIGN PATENTS OR APPLICATIONS

| 1,393,160 | 2/1965 | France................................. 43/14 |
| 93,312 | 2/1959 | Norway................................. 43/14 |

*Primary Examiner*—Warner H. Camp

[57] ABSTRACT

A seine-type fishing net has an elongated, flexible, inflatable tube secured adjacent the upper edge thereof; and portions of that elongated, flexible, inflatable tube are selectively deflatable to permit the adjacent portions of that upper edge to sink below the surface of a body of water in which that seine-type fishing net is disposed. Containers of fish food are disposed within the area defined by the seine-type fishing net; and, after fish have been attracted by the food within those containers, the deflated portions of the elongated, flexible, inflatable tube are re-inflated to cause the adjacent portions of that seine-type fishing net to rise to the surface of the body of water and thereby trap the fish within the area defined by that seine-type fishing net. A number of elongated, flexible, tensile elements are secured to the lower portion of the seine-type fishing net; and those elongated flexible, tensile elements can be pulled toward the bank of the body of water to move that lower portion of that seine-type fishing net toward that bank. An upwardly and inwardly inclined barrier is provided on the upper surface of the elongated, flexible, inflatable tube to keep most of the fish from rising up and over that upper surface. An inwardly-opening door is provided adjacent a large opening in the seine-type fishing net; and that door will permit fish to enter, but not to leave, the space which is defined in the body of water by the seine-type fishing net.

20 Claims, 17 Drawing Figures

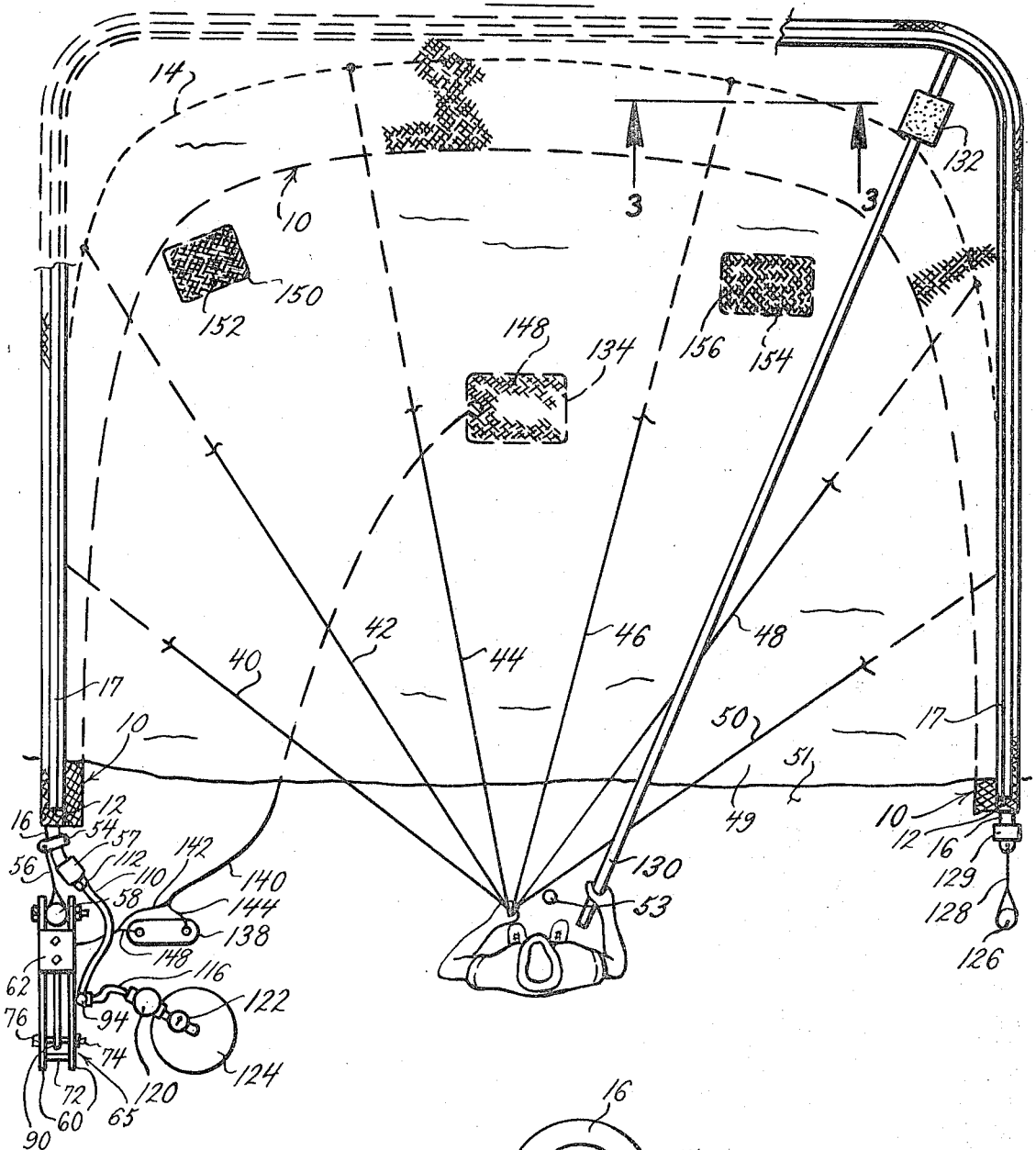

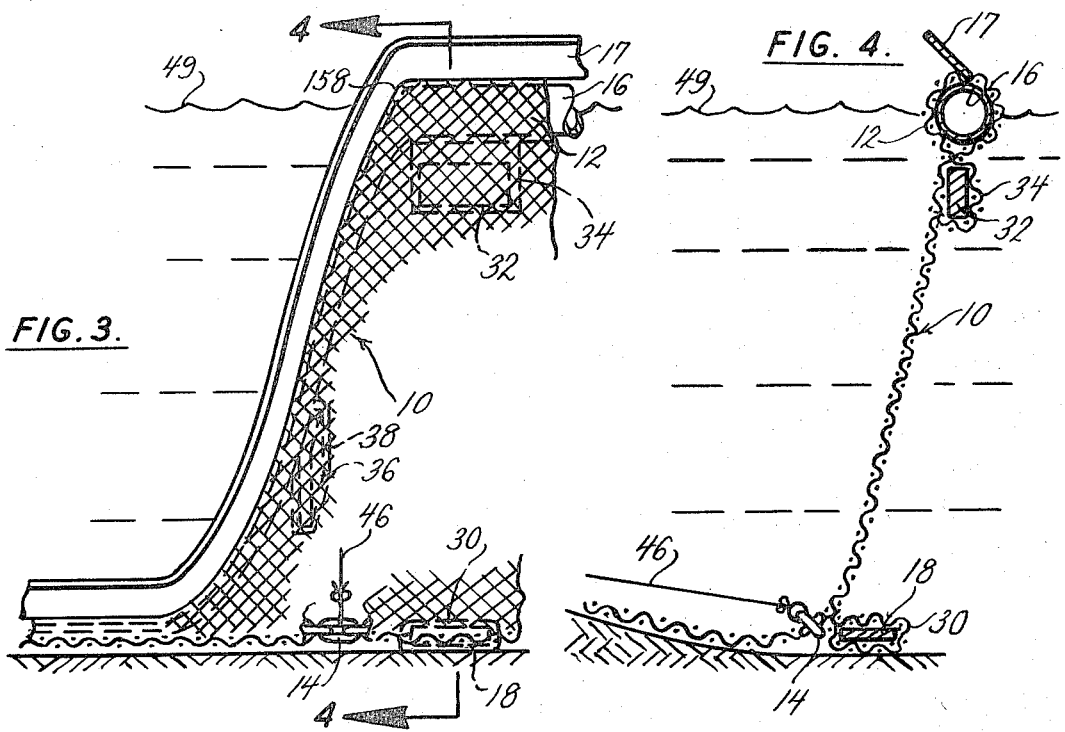
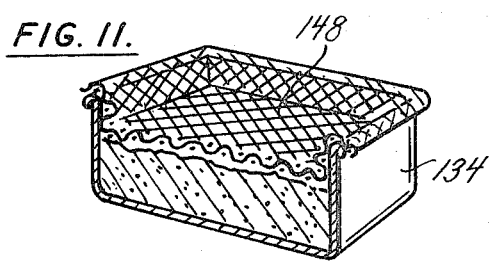
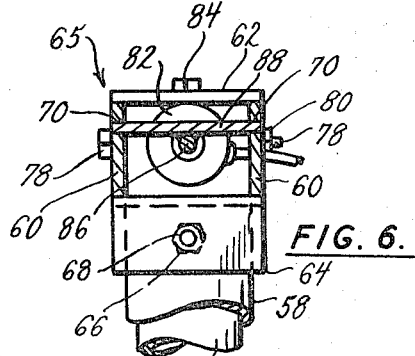
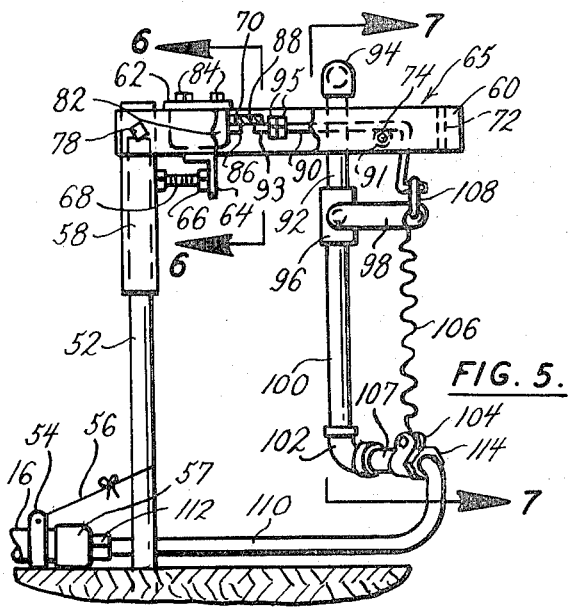
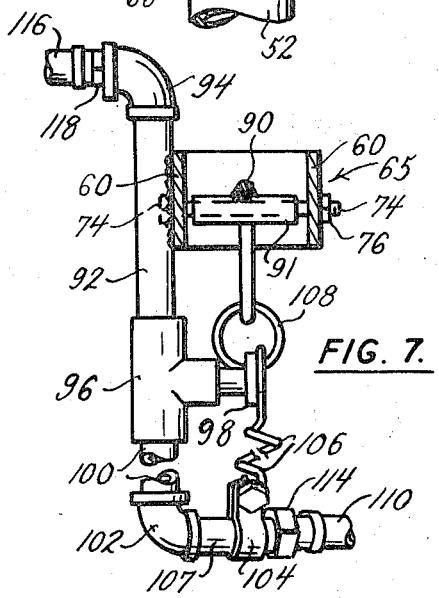

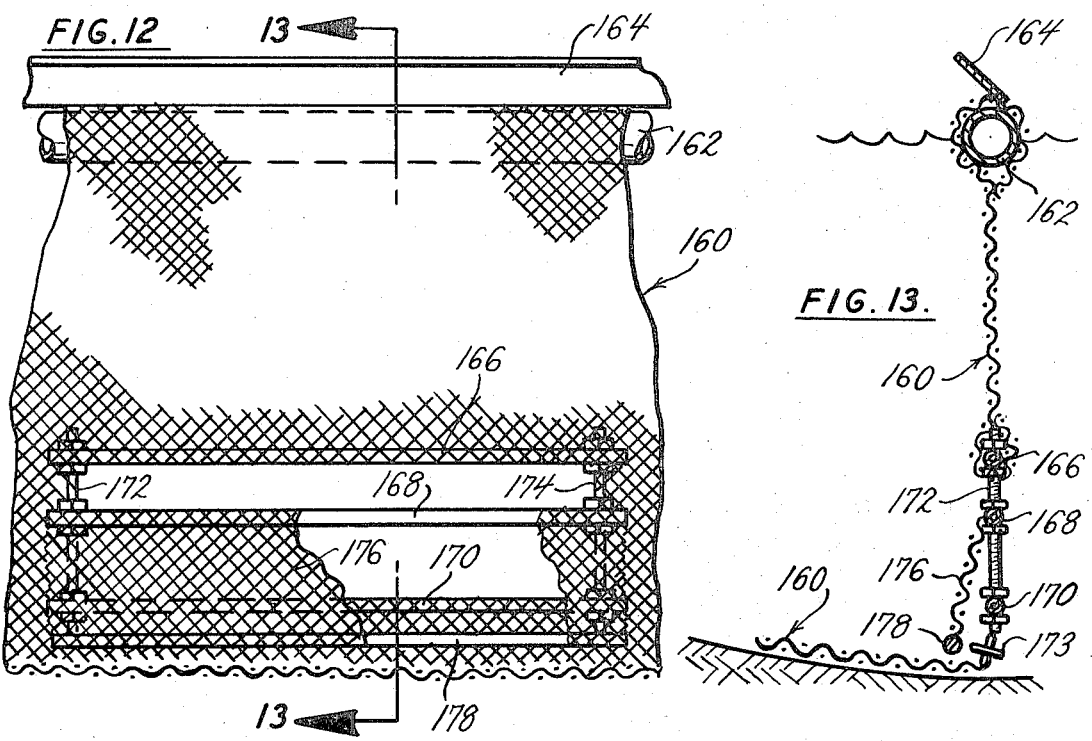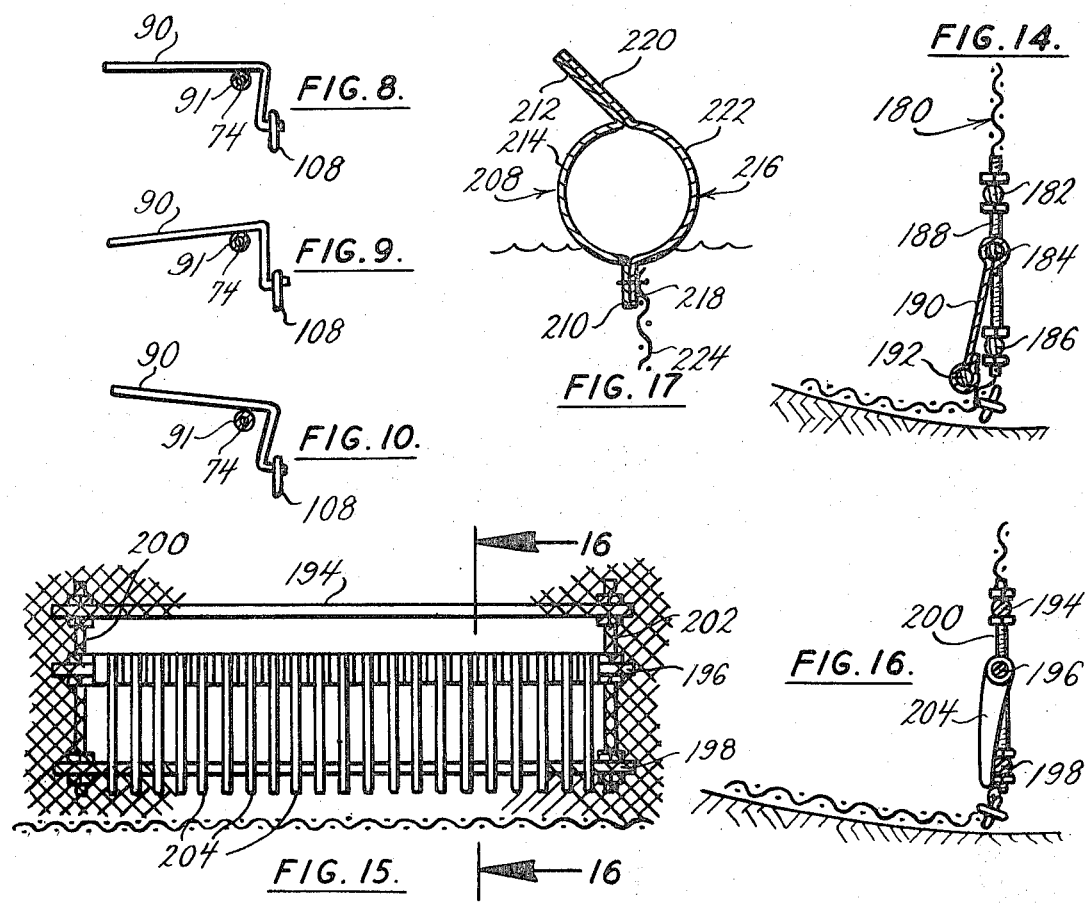

FISHING NET

This invention relates to improvements in fishing nets. More particularly, this invention relates to improvements in seine-type fishing nets which can be submerged below, or raised to, the surface of a body of water.

It is, therefore, an object of the present invention to provide an improved seine-type fishing net which can be submerged below, or raised to, the surface of a body of water.

The seine-type fishing net provided by the present invention has an elongated, flexible, inflatable tube secured adjacent the upper edge thereof; and portions of that elongated, flexible, inflatable tube can be selectively deflated to permit the adjacent portions of that upper edge to sink below the surface of a body of water in which that seine-type fishing net is disposed. Containers of fish food are disposed within the area defined by the seine-type fishing net; and that food will attract fish. After sufficient quantities of fish have moved into the area defined by the seine-type fishing net, the deflated portions of the elongated, flexible, inflatable tube can be reinflated to cause the adjacent portions of that seine-type fishing net to rise to the surface of the body of water, and thereby trap the fish within the area defined by that seine-type fishing net. It is, therefore, an object of the present invention to provide a seine-type fishing net with an elongated, flexible, inflatable tube secured adjacent the upper edge thereof which can have portions thereof deflated to permit the adjacent portions of that seine-type fishing net to sink below the surface of the body of water in which that seine-type fishing net is located.

The elongated, flexible, inflatable tube which is secured adjacent the upper edge of the seine-type fishing net can be "kinked" at various places along the length thereof to hold and confine quantities of air within pre-selected sections of the length of that elongated, flexible, inflatable tube and to permit intervening lengths of that elongated, flexible, inflatable tube to be devoid of air. Those pre-selected sections of the length of the elongated, flexible, inflatable tube will hold corresponding sections of the length of the upper edge of the seine-type fishing net at the surface of the body of water in which that seine-type fishing net is disposed, while permitting the intervening sections of the length of the upper edge of that seine-type fishing net to sink below the surface of that body of water. The submerged sections of the length of the upper edge of the seine-type fishing net will permit fish to freely enter the area defined by that seine-type fishing net; and then, subsequently, those sections of the length of the upper edge of that seine-type fishing net can be raised to the surface of the body of water, by the re-inflation of the corresponding intervening lengths of the elongated, flexible, inflatable tube, to trap those fish. It is, therefore, an object of the present invention to provide a seine-type fishing net with an elongated, flexible, inflatable tube which can have kinks formed therein to isolate air-containing sections of the length thereof from sections of the lengths thereof which are devoid of air.

A plurality of elongated, flexible, tensile elements is secured to the lower portion of the seine-type fishing net; and those elongated, flexible, tensile elements can be pulled toward the bank of the body of water to move that lower portion of that seine-type fishing net toward that bank. Those elongated flexible, tensile elements keep fish from pushing the lower portion of the seine-type fishing net outwardly into progressively-deeper water, and thereby keep those fish from pushing that lower portion into sufficiently deep water to enable them to swim under that lower portion. In addition, those elongated flexible, tensile elements make it possible for one person to "work" a large seine-type fishing net inwardly toward the bank of a body of water. It is, therefore, an object of the present invention to provide a seine-type fishing net with a plurality of elongated, flexible, tensile elements secured to the lower portion thereof.

An upwardly and inwardly inclined barrier is provided on the upper surface of the elongated, flexible, inflatable tube which is secured adjacent the upper edge of the seine-type fishing net. That barrier will keep most of the fish from rising up and over the upper surface of that elongated, flexible, inflatable tube; and it will thereby keep most of the fish from escaping from the space defined by the seine-type fishing net. It is, therefore, an object of the present invention to provide an upwardly and inwardly inclined barrier on the upper surface of an elongated, flexible, inflatable tube which is secured adjacent the upper edge of a seine-type fishing net.

An inwardly-opening door is provided adjacent a large opening in the seine-type fishing net; and that door can be opened by fish desiring to enter the space which is defined in the body of water by the seine-type fishing net. However, that inwardly-opening door will resist efforts of any fish to escape through the large opening in the seine-type fishing net; and hence that inwardly-opening door will permit fish to enter, but not to leave, the space which is defined in the body of water by the seine-type fishing net. It is, therefore, an object of the present invention to provide an inwardly-opening door adjacent a large opening in a seine-type fishing net.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

BRIEF DESCRIPTION OF THE DRAWING

In the drawing,

FIG. 1 is a broken plan view of one preferred embodiment of seine-type fishing net that is made in accordance with the principles and teachings of the present invention and of control apparatus therefor, FIG. 2 is a diagrammatic showing of the seine-type fishing net and control apparatus of FIG. 1, FIG. 3 is an elevational view, on a larger scale, of a portion of the seine-type fishing net of FIG. 1, and it is taken along the plane indicated by the line 3—3 in FIG. 1, FIG. 4 is a sectional view of the portion of the seine-type fishing net shown in FIG. 3, and it is taken along the plane indicated by the line 4—4 in FIG. 3, FIG. 5 is a broken-away, side elevational view, on a still larger scale, of the control apparatus for the seine-type fishing net of FIG. 1, FIG. 6 is a sectional view, on an even larger scale, through the control apparatus of FIG. 5, and it is taken along the plane indicated by the line 6—6 in FIG. 5, FIG. 7 is a sectional view, on the scale of FIG. 6, through the control apparatus of FIG. 5, and it is taken along the plane indicated by the line 7—7 in FIG. 5, FIG. 8 is a kinematic drawing showing a generally Z-shaped actuator in the control apparatus of FIGS. 1 and 5-7, FIG. 9 is another kinematic drawing of the generally Z-shaped actuator of FIG. 8, and it shows the long arm of that actuator inclining from lower left to upper right, FIG. 10 is a further kinematic drawing of the generally Z-shaped actuator of FIG. 8, and it shows the long arm of that actuator inclining from upper left to lower right, FIG. 11 is a perspective view, on a scale larger than that of FIG. 1, of a portion of one of the fish food containers shown in FIG. 1, FIG. 12 is an elevational view of part of another preferred embodiment of seine-type fishing net that is made in accordance with the principles and teachings of the present invention, FIG. 13 is a sectional view through the seine-type fishing net of FIG. 12, and it is taken along the plane indicated by the line 13—13 of FIG. 12, FIG. 14 is a sectional view through a third preferred embodiment of seine-type fishing net of the present invention, FIG. 15 is an elevational view of part of a fourth preferred embodiment of seine-type fishing net of the present invention, FIG. 16 is a sectional view through the seine-type fishing net of FIG. 15, and it is taken along the plane indicated by the line 16—16 in FIG. 15, and FIG. 17 is a sectional view through an alternate form of elongated, flexible, inflatable tube which could be used with any of the nets of FIGS. 1-16.

DESCRIPTION OF THE PREFERRED EMBODIMENTS

Referring to FIGS. 1-11 in detail, the numeral 10 generally denotes a seine-type fishing net which is made in accordance with the principles and teachings of the present invention. That net is elongated and is generally rectangular in elevation; and, in one preferred embodiment, that net is one hundred feet long and twelve feet high. However, the length of the net 10 can be longer or shorter than one hundred feet, and the height of that net can be greater or less than 12 feet — sometimes being as great as 20 feet. The net 10 closely resembles a seine-type fishing net of standard and usual design; but it differs from such a net in having an elongated, continuous heading or pocket 12 which can be formed by folding the upper edge of that net upon itself and then providing a sturdy seam between that folded upper edge and the adjacent portion of that net. The net 10 also differs from a seine-type fishing net of standard and usual design in having a chain or flexible cable 14 secured to the lead line of that net, and in spacing that chain and lead line between 1½ and 2 feet above the bottom edge of that net. The net 10 additionally differs from a seine-type fishing net of standard and usual design in having an elongated, flexible, inflatable tube 16 disposed within the heading 12 of that net; and the opposite ends of that tube preferably project beyond the opposite ends of that heading, as shown particularly by FIG. 1. The elongated, flexible, inflatable tube 16 preferably is made from a material which can confine air, which is flexible and light in weight, and which is able to withstand exposure to water, sunlight, air, cold and warmth. One such material is polyethylene and another such material is nylon; but any suitable material can be used. In the said one preferred embodiment, the elongated, flexible, inflatable tube 16 has an outside diameter of about 4 inches when it is fully inflated.

The net 10 additionally differs from a seine-type fishing net of standard and usual design in having a number of weights 32 and 36 secured thereto below, but adjacent to, the heading 12; and those weights are shown within pockets 34 and 38, respectively, that are secured to, or are part of, that net. The numeral 18 denotes weights which resemble the weights that are secured to the lead lines of standard and usual seine-type fishing nets; and those weights are shown within pockets 30. The net 10 further differs from a seine-type fishing net of standard and usual design in having the outer ends of a number of elongated and sturdy but readily-flexible cords 40, 42, 44, 46, 48 and 50 secured to the chain 14. Preferably those outer ends are connected to the chain 14 at points which are between 15 and 20 feet apart; and each of those cords is long enough to extend inwardly of the bank or shore 51 of the body of water 49 in which the net 10 is located. When the inner ends of the cords 40, 42, 44, 46, 48 and 50 are not being manipulated by a man, as indicated by FIG. 1, they will be tied to a stake 53 which is driven into the ground a short distance inwardly of the bank 51. That stake can be a length of pipe or tubing or can be a length of solid rod.

The numeral 17 denotes a barrier which inclines upwardly and inwardly from the upper surface of the elongated, flexible, inflatable tube 16; and that barrier is preferably made from a material which is flexible and light in weight, and which is able to withstand exposure to water, sunlight, air, cold and warmth. One such material is polyethylene and another such material is nylon; but any suitable material can be used. In the said one preferred embodiment, the barrier 17 is about 3 inches in height; and it is sewn to the heading 12 so it inclines upwardly and inwardly relative to the upper surface of the elongated, flexible, inflatable tube 16 at an angle of about 45°. As a result, when that elongated, flexible, inflatable tube is fully inflated, the upper edge of that barrier can be five inches or more above the surface of the body of water 49; and hence that barrier will be able to keep most fish from rising up and passing over it.

The numeral 52 denotes a second stake which is driven into the ground a short distance inwardly of the bank 51; and that stake also can be a length of pipe or tubing or can be a length of solid rod. A short cord 56 extends from the stake 52 to a clamp 54 which encircles one end of the elongated, flexible, inflatable tube 16 of the net 10. That end of that elongated, flexible, inflatable tube has a closure 57 which is equipped with a male-type fitting, not shown.

The numeral 58 denotes a sleeve, which can be a short length of pipe or tubing fitting over stake 52; and the numeral 60 denotes two elongated, generally-rectangular plates which have the left-hand ends thereof pivotally secured to the upper end of that sleeve by a bolt 78 and a nut 80, as indicated by FIG. 5. A short, relatively-narrow plate 62 is rigidly secured to the upper edges of both plates 60 adjacent the sleeve 58, as by welding; and a relatively-short, L-shaped bracket 64 is rigidly secured to the lower edges of both of those plates adjacent that sleeve, as by welding. A vertically-directed, plate-like spacer 72 is disposed between the inner faces of the free ends of the plates 60, as indicated by FIG. 5; and that spacer is rigidly secured to those free ends, as by welding. That spacer coacts with the plate 62, the L-shaped bracket 64, and the plates 60 to constitute a sturdy and rigid support 65 with parallel side walls.

A bolt 74 spans the distance between, and extends beyond, the plates 60; and a nut 76 is threaded onto the threaded end of that bolt to hold that bolt in assembled relation with those plates. As indicated particularly by FIGS. 1 and 5, the bolt 74 is close to the free ends of the plates 60. A nut 66 is secured to the vertically-directed arm of the L-shaped bracket 64, adjacent an opening in that arm; and the threaded shank of a bolt 68 is held by the thread within the nut 66. The bolt 68 has the head thereof bearing against the sleeve 58; and rotation of that bolt relative to the nut 66 will adjust the angular position of the support 65 relative to that sleeve within a plane prependicular to the axis of the bolt 78. The numeral 70 denotes slots within the plates 60 which are parallel to the upper edges of those plates; and those slots are disposed to the right of the plate 62, as that plate is viewed in FIG. 5.

The numeral 82 denotes a solenoid which is mounted between the plates 60 and which is fixedly secured to the plate 62 by fasteners 84, such as bolts, screws or the like. The plunger 86 of that solenoid is secured to the lower surface of a plate-like latch 88 which has the ends thereof disposed within the slots 70 in the plates 60. A generally Z-shaped actuator 90 has the hub 91 thereof rotatably mounted on the bolt 74; and the inclined arm of that actuator inclines downwardly and to the left in FIG. 5 to dispose the short arm of that actuator below the level of the bolt 74. The long arm of the actuator 90 extends to the left in FIG. 5 between the plates 60; and the end of that long arm is internally threaded to accommodate the threaded shank of a rod 93. That rod will be rotated relative to the axis of the long arm of the actuator 90 to dispose the left-hand end of that rod beneath the right-hand edge of the latch 88; and the two lock nuts 95 will be tightened to prevent accidental rotation of that rod relative to that long arm. Springs, not shown, within the solenoid 82 will normally hold the latch 88 adjacent the right-hand ends of the slots 70 in the plates 60, as indicated by FIG. 5; and thus will normally enable that latch to overlie the left-hand end of the rod 93 — thereby preventing clockwise rotation of the actuator 90 in FIG. 5. However, when that solenoid is energized, it will retract its plunger 86, and thus move the latch 88 toward the left-hand ends of the slots 70 — thereby freeing the rod 93 and the actuator 90 for rotation in the clockwise direction in FIG. 5.

The sleeve 58 has an inner diameter which is slightly larger than the outer diameter of the stake 52; and hence that sleeve can be telescoped downwardly over the upper end of that stake. The bolt 78 will limit the extent to which that sleeve can be telescoped downwardly over the upper end of that stake; and hence that bolt performs the dual functions of a pivot and of a stop. The weight of the support 65 will tend to cause the upper end of the sleeve 58 to shift to the right relative to the upper end of the stake in FIG. 5; but the bolt 68 can be adjusted to compensate for any consequent change in the angular position of that support.

The numeral 92 deontes a vertically-directed pipe which is welded to one of the plates 60, as shown by FIG. 6. A pipe ell 94 is threaded onto the upper end of the pipe 92, and the inlet port of a valve 96 is threaded onto the lower end of that pipe. A handle 98 for the valve 96 will be in an essentially-horizontal position when that valve is closed, but will be in a vertically-downward position when that valve is open. The numeral 100 denotes a pipe which extends downwardly from the outlet port of the valve 96; and that pipe has a pipe ell 102 and a nipple 107 secured to the lower end thereof. A clamp 104 is secured to that nipple; and a helical extension spring 106 has the lower end thereof secured to the clamp 104, and has the upper end thereof hooked through a ring 108. That ring is loosely connected to the free end of the handle 98 of the valve 96, and it is telescoped over the short arm of the Z-shaped actuator 90. The spring 106 biases the handle 98 downwardly toward open-valve position, and thus biases the Z-shaped actuator 90 for rotation in the clockwise direction in FIG. 5. However, as long as the solenoid 82 remains de-energized, the latch 88 will overlie the left-hand end of the rod 93 and prevent clockwise rotation of the actuator 90, and will thereby enable that actuator and the ring 108 to hold the handle 98 in closed-valve position.

The numeral 110 denotes a length of air hose which extends from the male fitting, not shown, on the closure 57 of the elongated, flexible, inflatable tube 16 to a male fitting, not shown, on the end of the nipple 107. The numeral 112 denotes a female fitting on one end of the length 110 of air hose which is securable to the male fitting on the closure 57 of the elongated, flexible, inflatable tube 16; and the numeral 114 denotes a female fitting on the other end of the length 110 of air hose which is securable to the male fitting on the end of the nipple 107. The numeral 116 denotes a length of air hose which has a female fitting 118 that mates with a male fitting connected to the pipe ell 94; and the other end of the length 116 of air hose has a female fitting which is secured to a male fitting on a pressure regulator 120 of standard and usual design. That pressure regulator and a pressure gauge 122 are connected to a gas tank 124 of standard and usual design; and that gas tank will usually contain a compressed gas such as compressed air. When the manually-operated valve, not shown, of that pressure tank is opened, the pressure regulator 120 will limit the pressure which the gas within that tank can apply to the length 116 of air hose; and that pressure regulator will preferably limit that pressure to a very low value. In the said one preferred embodiment, the pressure regulator 120 is set to maintain a pressure of only 4 ounces per square inch on the gas within the length 116 of air hose. As pointed out hereinbefore, the solenoid 82, the latch 88, the actuator 90, and the ring 108 normally hold the valve 96 in its closed position; and hence that valve will normally keep compressed gas from flowing to the elongated, flexible, inflatable tube 16.

The numeral 126 denotes a stake which is driven into the ground a short distance inwardly of the bank 51; and that stake can be a length of pipe or tubing or can be a length of solid rod. The stake 126 will be located a substantial distance from the stake 52; but that distance will be less than the length of the net 10. A flexible cord 128 is secured to a closure 129 for the elongated, flexible, inflatable tube 16; and that cord is tied to the stake 126 whenever the net 10 is in a static position within the body of water 49.

The numeral 130 denotes an elongated tube which is made with thin walls and which is made of light-weight material such as aluminum. That tube has both ends thereof closed to make it water-tight; and an annular float 132 of styrofoam or the like is telescoped over, and fixed to, one end of that tube. Because the tube 130 is thin-walled and made of light-weight material, and because it has both ends thereof closed, it will be buoyant and will be able to float on the surface of the body of water 49. The float 132 will enable the adjacent end of the tube 130 to float even when the opposite end of that tube is held several feet above the level of the surface of the body of water 49.

The numeral 134 denotes a container which can be rested on the bottom of the body of water 49 within the area which is defined by the net 10. That container has a mercury switch 136 secured to the interior of one side thereof, and that switch will be "open" as long as that container is resting upon the bottom of the body of water 49. The container 134 is made so it is buoyant when it is empty; and hence that container will tend to rise upwardly toward the surface of the body of water 49. However, as long as that container has a predetermined minimum amount of fish food therein, it will rest upon the bottom of the body of water 49.

The numeral 138 denotes a battery; and that battery will preferably be located on the ground a short distance inwardly from the bank 51. A cable 140 contains a conductor 142 which extends from the switch 136 to one terminal of the solenoid 82, and also contains a conductor 144 which extends from that switch to one terminal of the battery 138. A further conductor 146 extends from the other terminal of the battery 138 to the other terminal of the solenoid 82.

The numeral 148 denotes a mesh-like cover which can be applied to the container 134 after that container has been filled with fish food. The interstices of that mesh-type cover are preferably about three-eighths of an inch long and about three-eighths of an inch wide; and hence they are small enough to keep even very small fish from passing through that cover and directly eating the fish food within the container 134. However, the interstices in that mesh-type cover are large enough so fish can agitate the water adjacent that mesh-type cover to such an extent that the agitated water will force fish food within the container 134 to work its way out through those interstices. In keeping the fish from having direct access to the fish food within the container 134, and in forcing those fish to agitate the water sufficiently to cause that fish food to escape from that container through the interstices thereof, the mesh-type cover 148 delays the consumption of that fish food until substantial numbers of fish have had sufficient time to reach the vicinity of that container. As indicated by FIG. 11, the central portion of the mesh-type cover 148 is loose, and thus will droop downwardly into the container 134 a distance about one-third the depth of that container.

The numerals 150 and 154 denote further containers which resemble the container 134 but which are not equipped with switches. The container 150 has a mesh-type cover 152 thereon, and the container 154 has a mesh-type cover 156 thereon. The mesh-type covers 152 and 156, like the mesh-type cover 148, will keep a limited number of fish from quickly eating all of the fish food within the containers 150 and 154. Instead, those mesh-type covers will provide enough time for substantial numbers of fish to reach the vicinities of the containers 150 and 154. Also, like the mesh-type cover 148, the mesh-type covers 152 and 156 will have the central portions thereof loose so they can droop downwardly into the containers 150 and 154, respectively, distances about one-third the depths of those containers.

When the elongated, flexible, inflatable tube 16 is deflated, the net 10 can be handled in a manner which is similar to the manner in which seine-type nets of standard and usual design are handled. As a result, when that elongated, flexible, inflatable tube is deflated, the net 10 can occupy a relatively small volume, and thus can be easily handled.

When it is desirable to dispose the net 10 within the body of water 49, the fitting 112 on the length 110 of air hose will be secured to the male fitting, not shown, on the closure 57 of the elongated, flexible, inflatable tube 16; and then the latch 88 will be manually pushed to the left in FIG. 5 to release the actuator 90. Thereupon, the spring 106 will rotate the actuator 90 in the clockwise direction in FIG. 5 until the short arm of that actuator releases the ring 108; and then that spring will move that ring and the valve handle 98 downwardly to open-valve position. The elongated, flexible, inflatable tube 16 can be fully or partially inflated, as desired; but it should be inflated to such an extent that it will make the upper edge of the net 10 buoyant and sufficiently stiff to enable the operator to remain on the bank and push that net outwardly into the body of water 49.

The cord 56 will hold that end of the elongated, flexible, inflatable tube 16, which has the closure 57 thereon, adjacent the stake 52; and the cord 128 will hold the opposite end of that elongated, flexible, inflatable tube adjacent the stake 126. Intervening portions of the length of the net 10 can be pushed outwardly and away from the bank 51 by means of the tube 130, as indicated by FIG. 1. Because the float 132 is adjacent the outer end of the tube 130, that float will hold that outer end at water level — and thus in register with the heading 12 of the net 10 — even when the inner end of that tube is held several feet above the level of the surface of the body of water 49. The operator may or may not want to use the cords 40, 42, 44, 46, 48 and 50 to determine the extent to which the various portions of the length of the upper edge of the net 10 are pushed outwardly by the tube 130.

As the tube 130 is used to push the upper edge of the net 10 outwardly and away from the bank 51, the heading 12 of that net will move ahead of, and will tend to pull, the chain 14 along with it. The engagement of that chain and of the weights 18 with the bottom of the body of water 49 will retard the outward movement of that chain; and hence that chain will lag behind the heading 12, as indicated particularly by FIG. 1. The portion of the net 10 which is located below the level of the chain 14 will lag even further behind the heading 12, as shown by FIGS. 1 and 4; and hence that portion will remain inwardly of that chain. That portion will rest upon the bottom of the body of water 49; and will thereby make it very difficult, if not impossible, for fish to successively work their way under that portion and under the chain 14. Consequently, the chain 14 and the portion of the net 10 therebelow will effectively keep fish from escaping from the area defined by that net.

The extent to which the elongated, flexible, inflatable tube 16 will be inflated will be determined by the length of time during which the spring 106 is permitted to hold the valve handle 98 in its downward, open-valve position. Whenever it is desired to halt the inflation of that elongated, flexible, inflatable tube, that valve handle will be rotated in the counter-clockwise direction to the position shown by FIG. 5, the Z-shaped actuator 90 will be rotated in the counter-clockwise direction to the position of FIG. 5, and then the ring 108 will be hooked over the short arm of that actuator. Thereafter, until the solenoid 82 is energized, or until the latch 88 is again manually shifted to the left, the actuator 90 will hold the ring 108 and the valve handle 98 against downward movement — and thus will keep the valve 96 closed.

The operator can, by using the tube 130 alone or in combination with one or more of the cords 40, 42, 44, 46, 48 and 50, dispose various portions of the upper edge of the net 10 at desired distances and at desired angular positions relative to the bank 51 while he stands on that bank. After those various portions of that upper edge have been appropriately positioned, the chain 14 and the weights 18 will tend to hold those portions in those positions. Usually, the various portions of the upper edge of the net 10 will be arranged to enable that net to define an area which is generally rectangular and which has the long axis thereof parallel to the bank 51.

To enable fish to enter the area defined by the net 10, the operator can separate the female fitting 112 from the male fitting, not shown, on the closure 57 adjacent the stake 52. If desired, the operator could permit all of the gas within the elongated, flexible, inflatable tube 16 to escape; and, in that event, all portions of the upper edge of the net 10 would sink to the bottom of the body of water 49. To enable all of the gas to escape from all portions of the elongated, flexible, inflatable tube 16, the weights 32 and 36, and similar weights spaced along the length of the heading 12 of the net 10, should be given individually-different values. Specifically, the weight adajcent to the closure 129 should be heaviest, the weight adjacent to the closure 57 should be lightest, and the weights intermediate the heaviest and lightest weights should be progressively lighter. In such event, the portion of the elongated, flexible, inflatable tube 16 which was most remote from the stake 52 would be the first to sink below the surface of the body of water 49 when the female fitting 112 was separated from the male fitting, not shown, on the closure 57; and thereafter more and more of the length of that elongated, flexible inflatable tube would progressively sink below that surface. Finally, if all of the gas within that elongated, flexible, inflatable tube was permitted to escape, all portions of that elongated, flexible, inflatable tube would sink below the surface of the body of water 49. As any given portion of the elongated, flexible, inflatable tube 16 starts to sink below the surface, the water pressure will help expel the gas from that portion; and hence that elongated, flexible, inflatable tube can become essentially-completely devoid of gas.

Usually, however, it will not be desirable to permit all of the gas to escape from the elongated, flexible, inflatable tube 16; because it takes an appreciable amount of time to fully reinflate that elongated, flexible, inflatable tube with gas under low pressure after that elongated, flexible, inflatable tube has been fully deflated. Consequently, it will usually be desirable to deflate and submerge only limited portions of the overall length of the elongated, flexible, inflatable tube 16. To make it possible to deflate and submerge a given portion of the length of the elongated, flexible, inflatable tube 16, that portion should be equipped with weights 36 which are heavier than the weights 32 with which the adjacent lengths of that elongated, flexible, inflatable tube are equipped; and, in addition, the masses of the weights 36 should increase progressively as the spacing between those weights and the closure 57 increases. In such event, the far end of the given portion of the elongated, flexible, inflatable tube 16 will tend to sink before the adjacent lengths of that elongated, flexible, inflatable tube can sink as gas is released from that elongated, flexible, inflatable tube. As that gas is being released, the operator can raise the inner end of the tube 130, move it into position above the far end of that given portion of the elongated, flexible, inflatable tube 16, and then cause or permit that inner end to move downwardly and provide a downwardly-directed kink 158 in that elongated, flexible, inflatable tube. That kink will act to prevent the further escape of gas from the length of the elongated, flexible, inflatable tube 16 to the right of that kink; and hence that length will remain buoyant and will hold the adjacent portion of the upper edge of the net 10 at the surface of the body of water 49. The portion of the elongated, flexible, inflatable tube 16 to the left of the kink 158 will progressively sink down toward the bottom of the body of the water 49, as indicated by FIG. 3; and the pressure of the water on that portion will progressively force the gas out of that portion.

As the gas moves out of the submerging portion of the elongated, flexible, inflatable tube 16 and moves toward the closure 57, that gas will tend to keep the length of that elongated, flexible, inflatable tube, which is intermediate that submerging portion and that closure, buoyant. As the gas continues to escape from the closure 57, the operator can form a further kink in the elongated, flexible, inflatable tube 16 at the other end of the portion which is to be submerged. To form that kink, the operator can again raise the inner end of the tube 130, can move it into position above the near end of the portion which is to be submerged, and then cause or permit that inner end to move downwardly and provide a second kink in the elongated, flexible, inflatable tube 16. Thereupon, the operator will thread the female fitting 112 back onto the male fitting, not shown, on the closure 57 to prevent further escape of gas from the elongated, flexible inflatable tube 16; and, at such time, the gas between that closure and the second kink will be trapped, and will provide the desired buoyancy for the length of the elongated, flexible, inflatable tube 16 which is between that closure and that second kink. The kink 158 and the second kink, not shown, will coact with the pressure of the water on the submerged portion of the elongated, flexible, inflatable tube 16 to keep the gas in the buoyant adjacent lengths of that elongated, flexible, inflatable tube from leaking into that submerged portion. Consequently, the major part of the length of that submerged portion, and of the corresponding part of the net 10, will sink to the bottom of the body of water 49, and will freely permit fish to enter the area which is defined by the buoyant lengths of the elongated, flexible, inflatable tube 16 and by the corresponding lengths of that net.

If desired, two or more spaced-apart portions of the length of the elongated, flexible, inflatable tube 16 can be submerged and can have buoyant lengths of that elongated, flexible, inflatable tube interposed therebetween. To accomplish such a result, the operator need only secure the desired kinds and numbers of weights to the appropriate portions of the length of the heading 12 of the net 10, and then appropriately form the kinks needed to effect the isolation of the submerged portions of the elongated, flexible, inflatable tube 16 from the buoyant lengths of that elongated, flexible inflatable tube.

After the net 10 has been set in a desired position within the body of water 49, and after the appropriate portion or portions of the elongated, flexible, inflatable tube 16 has or have been submerged beneath the surface of that body of water, the containers 134, 150 and 154 can be set in position. Those containers can be set in position by lowering them down from a boat or raft, or they can be set in position by the operator as he wades into the area defined by the net 10. The operator will set the container 134 so the switch 136 is open; and then he will appropriately connect the conductor 144 to the appropriate terminal of the battery 138. Subsequently, as fish enter the area defined by the net 10, by swimming over the submerged portion or portions of that net, they will be attracted by the fish food within the containers 134, 150 and 154. Where those containers are covered with the mesh-type covers 148, 152 and 156, respectively, the fish will have to agitate the water adjacent those containers to cause the fish food to pass outwardly through the interstices of those mesh-type covers and become available to the fish. The resulting delay in the consumption of the fish food by the fish will make it possible for very large numbers of fish to enter the area defined by the net 10.

After the fish have caused most of the fish food within the container 134 to move outwardly through the interstices of the mesh-cover 148, the buoyant nature of that container will cause that container to start rising toward the surface of the body of water 49. The cable 140 will tend to remain on the bottom of that body of water, and thus will apply a downward force to one side of the container 134; and that downward force will coact with the upward force provided by the buoyancy of that container to invert that container and "close" the switch 136. The resulting energization of the solenoid 82 will enable that solenoid to shift its plunger 86 and the latch 88 to the left in FIG. 5 — thereby freeing the actuator 90 for clockwise rotation in FIG. 5. The ring 108 will thus be freed, and the spring 106 will rotate the valve handle 98 downwardly to open-valve position, and thereby permit gas from the tank 124 to pass through the pressure regulator 120, the length 116 of air hose, the pipe ell 94, the pipe 92, the valve 96, the pipe 100, the pipe ell 102, the nipple 107, and the length 110 of air hose to the elongated, flexible, inflatable tube 16. That gas will successively straighten out the kinks, which had been formed in that elongated, flexible, inflatable tube, and fully inflate the submerged portions of that elongated, flexible, inflatable tube. Those submerged portions will rise to the surface of the body of water and they will coact with the lengths of the elongated, flexible, inflatable tube 16, which had remained at that surface, to hold all portions of the upper edge of the net 10 in position adjacent that surface to trap the fish which are within the area defined by that net.

The very low pressure which is maintained on the gas that is supplied to the elongated, flexible, inflatable tube 16, to inflate the submerged portions of that elongated, flexible, inflatable tube, minimizes the noise which can be sensed by the fish. Where a gas pressure of just four ounces has been used, the noise level has been so low the net 10 has been able to catch the same catfish night after night. Thus, despite the fact that catfish are known to be very wary fish, and also despite the fact that catfish are known to become trap-shy.

As the submerged portions of the elongated, flexible, inflatable tube 16 become inflated and raise the upper edge of the net 10 to the surface of the body of water, the fish will be trapped but will not be injured in any way. Instead, the fish will be able to swim freely and easily within the area defined by the net 10, and they will have a full opportunity to derive ample oxygen from the water within that area. As a result, the fish can safely be left within the area defined by the net 10 until a convenient time for their removal, usually the next morning.

To harvest the fish, the operator will grip the inner ends of the cords 40, 42, 44, 46, 48 and 50 and will pull those inner ends toward him, either simultaneously or successively. The resulting forces that are applied to the chain 14 will cause that chain to move toward the bank 51; and that chain and the weights 18 will cause the adjacent portions of the net 10 to closely follow the surface of the bottom of the body of water. Consequently, that chain and those weights will enable the lower portion of the net 10 to continuously confine the fish as the area defined by that net is progressively reduced in size. The inwardly-directed forces which are applied to the chain 14 by the flexible cords 40, 42, 44, 46, 48 and 50 also will cause the elongated, flexible, inflatable tube 16 to move inwardly toward the back 51.

The securement of the flexible cords 40, 42, 44, 46, 48 and 50 to the lower portion of the net 10 is extremely desirable; because those flexible cords will tend to pull the lower edge of that net under, rather than over, the fish. Experience has shown that where a net is pulled toward the bank by the application of forces to the upper edge of that net, and where the lower edge of that net has been permitted to lag behind that upper edge, strong fish have frequently been able to force their way under that lagging lower edge and escape. However, where the flexible cords 40, 42, 44, 46, 48 and 50 are used to pull the chain 14 inwardly toward the shore, few if any fish are able to escape under the lower edge of the net 16.

After the various sections of the net 16 have been drawn inwardly toward the bank 51 by use of the flexible cords 40, 42, 44, 46, 48 and 50, the operator can tie appropriate portions of those flexible cords to the stake 53. Also, if desired, the operator can successively release the cords 56 and 128 and pull the ends of the net 10 further up the bank 51. Thereafter, the operator can wade into the body of water 49; and he can wade into the area defined by the net 10 and pick out the fish and place them in appropriate containers, or he can wade into the area which is immediately outside of that defined area and pick out the fish and place them in appropriate containers. Because the elongated, flexible, inflatable tube 16 is flexible, the operator can easily pull or push any given portion of that elongated, flexible, inflatable tube, and hence the corresponding portion of the length of the upper edge of the net 10, toward or away from him to make it easy to pick out the fish.

In any instance where an unusually long net is to be used, a pole can be set in the body of water 49 at a point intermediate the outer ends of the flexible cords 44 and 46; and that pole can be used to hold the middle portion of the upper edge of the net 10 against sinking when some of the gas is released from the elongated, flexible, inflatable tube 16. Where such a pole is used, the operator can successively move each of the closures 57 and 129 further inwardly of the bank 51 and then suitably secure them in position relatively close to each other. At such time, the net 10 will define an elongated, relatively narrow area which extends outwardly from the bank 51 to that pole; and the operator can then wade out into that area, or into that portion of the body of water 49 on either side of that area, pick out the fish, and then place them in appropriate containers for shipment.

Not only are the flexible cords 40, 42, 44, 46, 48 and 50 useful in keeping the fish from escaping from the area defined by the net 10 as that net is being pulled toward the bank 51, but those flexible cords also are useful in keeping fish from escaping that net when that net is in a static condition. Specifically, when the inner ends of those flexible cords are secured to the stake 53, those flexible cords will effectively keep large fish from progressively moving portions of the bottom edge of the net 10 further and further away from the bank 51, and thus will keep those fish from moving that bottom edge far enough outwardly to enable them to slip under that bottom edge. Experience has shown that where flexible cords are not secured to the lower portion of a net, large fish are able to push various portions of the bottom edge of that net far enough outwardly and upwardly to enable them to slip under that bottom edge.

The use of the flexible cords 40, 42, 44, 46, 48 and 50 and of the stakes 52, 53 and 126 makes it possible for one man to set the net 10 by himself, and also to harvest the trapped fish by himself. In this way, those flexible cords and those stakes make economic the operation of fish ponds for the raising of fish for the market.

In some instances, it is desirable to use machines which blow the fish food through the air and then let that fish food settle on the surface of the body of water 49 which is surrounded by the partially or wholly submerged elongated, flexible, inflatable tube 16. Where that is done, the fish can be expected to promptly move into the area which is defined by the net 10; and hence the container 134 with its switch 136 will not be needed. Moreover, the containers 150 and 154 will not be needed; and the solenoid 82, the latch 88, the ring 108 and the spring 106 will not be needed. The operator need only wait until the fish are actively eating the fish food, and then manually move the valve handle 98 downwardly to open-valve position.

Although different lengths of the elongated, flexible, inflatable tube 16 can be submerged, in exact length that is submerged is not critical. For example, sizable numbers of fish have been trapped by a 100 foot long net 10 which had the entire length of the upper edge thereof wholly submerged before the elongated, flexible, inflatable tube 11 thereof was reinflated; and sizable numbers of fish also have been trapped by that net when only 10 feet of its upper edge were submerged before that elongated, flexible, inflatable tube was reinflated. It thus should be clear that the net provided by the present invention can be used by persons without special training or skill.

In the said one preferred embodiment, the weights 32 and 36 and the other weights, not shown, adjacent the upper edge of the submergible portion of the net 10 are spaced apart about 4 feet. Those weights should increase progressively, by between one-half of an ounce and an ounce per weight, as those weights are progressively displaced from the closure 57 of the elongated, flexible, inflatable tube.

The barrier 17 acts to help keep fish from escaping from the area defined by the net 10, whether that net is static or is being moved inwardly toward the bank 51. As fish attempt to rise up and over the upper surface of the elongated, flexible, inflatable tube 16, they will encounter the barrier 17; and they find it very difficult to rise up and over that barrier. Experience has shown that fish are occasionally able to rise up and over the upper surface of the elongated, flexible, inflatable tube 16 when that elongated, flexible, inflatable tube is not equipped with the barrier 17; but that fish are rarely able to rise up and over the upper surface of the elongated, flexible, inflatable tube 16 when that elongated, flexible, inflatable tube is equipped with that barrier. If desired, the barrier 17 could be made integral with the elongated, flexible, inflatable tube 16, as by an extruding operation or the like.

The adjustment of the position of the support 65, which is provided by the bolt 68, is desirable because it provides a desirable adjustment in the pressure between the latch 88 and the left-hand end of the rod 93. Specifically, by rotating the bolt 68 so it raises the right-hand end of the support 65, it is possible to increase the ratio between the effective lengths of the moment arm for the ring 108 and of the moment arm for the rod 93 — and thus increase the pressure between that rod and the latch 88. In contrast, by rotating the bolt 68 so it lowers the right-hand end of the support 65, it is possible to decrease the ratio between the effective lengths of the moment arm for the ring 108 and of the moment arm for the rod 93 — and thus decrease the pressure between that rod and the latch 88. When the bolt 68 is adjusted so the long upper arm of the actuator 90 of the preferred embodiment is horizontal, as shown by FIG. 8, the moment arm of the ring 108 will be one-quarter of an inch and the moment arm of the rod 93 will be 8 inches. The resulting ratio of the moment arms will be 1 to 32. When the bolt 68 is adjusted to raise the right-hand end of the support 65, as shown by FIG. 9, the moment arm of the ring 108 will be greater than one-quarter of an inch and the moment arm of the rod 93 will be slightly less than 8 inches; and hence the resulting ratio of moment arms will be greater than 1 to 32. However, when the bolt 68 is adjusted to lower the right-hand end of the support 65, as shown by FIG. 10, the moment arm of the ring 108 will be less than one-quarter of an inch and the moment arm of the rod 93 will be slightly less than 8 inches; and hence the resulting ratio of moment arms will be less than 1 to 32. By merely adjusting the position of the bolt 68, the operator can obtain a desirable balance between a "hair trigger" setting for the latch 88 and a firm setting for that latch. In either event, the bolt 68 should be adjusted so the solenoid 82 is able to move the latch 88 out of the path of the rod 93.

The inner diameter of the sleeve 58 will be sufficiently larger than the outer diameter of the stake 52 to enable that sleeve to easily telescope downwardly over the top of that stake. Any resulting "play" between that sleeve and that stake will be compensated for the bolt 68 as that bolt is adjusted to adjust the position of the support 65. Thus it should be apparent that the bolt 68 performs a dual function — permitting ready adjustment in the pressure between the latch 88 and the rod 93, and compensating for any play between the sleeve 58 and the stake 52.

Referring particularly to FIGS. 12 and 13, the numeral 160 generally denotes a second preferred embodiment of seine-type fishing net which is made in accordance with the principles and teachings of the present invention. That net has an elongated, flexible, inflatable tube 162 secured within an elongated heading or pocket adjacent the upper edge of that net; and that net has a chain 173 spaced between 1½ and 2 feet above the bottom edge thereof. A barrier 164 inclines upwardly and inwardly at an angle of about 45° from the heading which encloses the elongated, flexible, inflatable tube 162. The net 160 also will be equipped with flexible cords, not shown, which can be identical to the flexible cords 40, 42, 44, 46, 48 and 50 of FIG. 1. In all these respects, the net 160 can be essentially identical to the net 10.

However, the net 160 differs from the net 10 in having an elongated gauging element 168 and in having an elongated gauging element 166 and threaded rods 172 and 174 which are secured to that net and which coact with the gauging element 168 to define a gauging opening in that net. Those gauging elements can be identical or similar to the gauging elements which are disclosed in my co-pending application Ser. No. 206,789 for Fishing Net which was filed Dec. 10, 1971. The gauging elements 166 and 168 are shown as lengths of pipe or tubing which are spaced apart by nuts that are threaded onto the threaded rods 172 and 174; and the vertical distance between those gauging elements can be adjusted by appropriate adjustment of the positions of those nuts along the lengths of those threaded rods. The numeral 170 denotes a bar, which is shown as a length of pipe or tubing, that is secured to the net 160 and that also is secured to the threaded rods 172 and 174 by further nuts; and that bar coacts with the gauging element 168 to define an opening which is substantially larger than the opening defined by the gauging elements 166 and 168. The opening which is defined by the gauging element 168 and the bar 170 is large enough to accommodate the largest fish that is to be trapped within the area defined by the net 160.

The numeral 176 denotes a net-like door which has the upper edge thereof secured to the gauging element 168, and which gauging a bar-like weight 178 secured to the lower edge thereof. That bar-like weight and that door are longer than, and are disposed inwardly of, the opening which is defined by the gauging element 168 and the bar 170; and hence that bar-like weight and that door will keep any fish from forcing their way outwardly through that opening. However, that bar-like weight and that door can readily be moved inwardly; and hence they can readily permit fish to force that door far enough inwardly to enable those fish to pass inwardly through the opening which is defined by the guaging element 168 and by the bar 170.

The net 160 provides two desirable features which are not provided by the net 10. Firstly, the net 160 enables small fish to freely enter and escape from the area which is defined by that net, after all portions of the upper edge of that net have been raised to the surface by the re-inflation of the previously-submerged portions of the elongated, flexible, inflatable tube 162. Specifically, the opening which is defined by the gauging elements 166 and 168, and which is exposed when the portions of the elongated, flexible, inflatable tube 162 in register with that opening are re-inflated to raise those gauging elements off of the bottom of the body of water, will permit small fish to freely enter and escape from the area which is defined by the net 160. In permitting small fish to freely escape from that area, the gauging elements 166 and 168 relieve the operator of all need of handling those small fish; thereby avoiding all possible injury to those small fish, and also minimizing the amount of work which the operator must do in harvesting the fish trapped by the net 160. In permitting small fish to freely enter the area which is defined by the net 160, the gauging elements 166 and 168 permit small fish to lead large fish into close proximity to the opening which is defined by the gauging element 168 and the bar 170.

Secondly, the net-like door 176 and the bar-like weight 178 will permit large fish to move into the area which is defined by the net 160 after the portions of the elongated, flexible, inflatable tube 162 in register with that door and that weight have been reinflated and have raised the gauging element 168 and the bar 170 off of the bottom of the body of water. This means that the net 160 can continue to trap fish by permitting them to pass inwardly of the door 176 even when all portions of the elongated, flexible, inflatable tube 162 have risen to the surface of the body of water. Those fish may push the door 176 inwardly to reach the fish food adjacent a container like one of the containers 134, 150 and 154, or they may push that door inwardly to reach small fish which swam inwardly through the opening defined by the gauging elements 166 and 168; but, once those fish have moved inwardly beyond the door 176, that door will automatically close and keep those fish from escaping from the net 160.

Referring particularly to FIG. 14, the numeral 180 generally denotes the lower portion of a seine-type fishing net which can be essentially identical to the seine-type fishing net 160 of FIGS. 12 and 13. The numerals 182 and 184 denote gauging elements which can be identical to the gauging elements 166 and 168; and the numeral 186 denotes a bar which can be identical to the bar 170. The numeral 188 denotes a threaded rod which can be identical to the threaded rod 172; and nuts on that threaded rod will appropriately space apart one end of each of the gauging elements 182 and 184 and of the bar 186. A further rod, not shown, which will correspond to the threaded rod 174, will have nuts thereon that space apart the opposite end of each of those gauging elements and of that bar. The numeral 190 denotes a door which performs the function of the net-like door 176 but which consists of an inperforate flexible sheet of plastic material. The numeral 192 denotes a bar-like weight which can be identical to the bar-like weight 178 and which is secured to the lower end of the door 190.

The net 180 will be essentially identical to the net 160; and it will differ from that net only in having an imperforate door instead of a net-like door. Large fish will be able to move the door 190 far enough inwardly to enable them to enter the area which is defined by the net 180; but, after those fish have entered that area, the bar-like weight 192 will hold that door in position to close the opening which is defined by the gauging element 184 and the bar 186. Consequently, the net 180, like the net 160, will permit large fish to enter the area defined by it, but will keep large fish from escaping from that area.

Referring particularly to FIGS. 15 and 16, the numerals 194 and 196 denote gauging elements which can be identical to the gauging elements 166 and 168 of the net 160 in FIGS. 12 and 13. The numeral 198 denotes a bar which can be identical to the bar 170; and the numerals 200 and 202 denote threaded rods which can be identical to the threaded rods 172 and 174. The gauging element 194, the bar 198, and the threaded rods 200 and 202 will be secured to a net which is comparable to the net 160. Those gauging elements and those threaded rods will define a small opening which will permit small fish to freely enter and leave the area defined by the net; and the gauging element 196 and the bar 198 and those threaded rods will define a larger opening which will permit large fish to enter that area. A number of plastic-clad metal fingers 204 are rotatably mounted on the gauging element 196; and those fingers will normally respond to gravity, whenever the upper edge of the net is held at the surface of a body of water, to bear against the bar 198. However, any one or more of those plastic-clad fingers can move inwardly in response to the force which a large fish exerts as it attempts to enter the opening which is defined by the gauging element 196, the bar 198 and the threaded rods 200 and 202; and hence those plastic-clad fingers will readily permit large fish to enter that opening. However, after any one or more of the plastic-clad fingers 204 has rotated inwardly to permit one or more large fish to pass inwardly through that opening, that finger or those fingers will respond to gravity to return to the position indicated by FIGS. 15 and 16; and will thereafter keep that large fish or any other large fish from escaping through that opening. The fingers 204 will cost more than will the door 176 or the door 190; but those fingers will tend to be more resistant to the escape of fish, because only the fingers 204 that are being contacted by a large fish will be out of fish-blocking position at any given instance, and the rest of those fingers will be in fish-blocking position.

Where the gauging opening and the entering opening are incorporated into the portion of a net which is lowered to permit fish to enter a given area and then is raised to confine those fish within that area, the gauging elements and the door or plastic-clad metal fingers will rest on the bottom of the body of water, and thus be inactive, whenever that net is in its lowered position. However, when that net is in its raised position, or where the gauging opening and the entering opening are incorporated into the portion of a net which is always held in raised position, the gauging elements and the door or plastic-clad metal fingers will be in active position at all times.

If desired, the elongated, flexible inflatable tube 16 or the elongated, flexible inflatable tube 162 could be made by bonding together the upper and lower edges of two elongated, flexible strips of air-impervious material. Further, if desired, the bonded upper edges of those elongated, flexible strips of air-impervious material could be made high enough to enable them to act as a barrier, such as the barrier 17 or the barrier 164. In FIG. 17, the lower edge 210 of an elongated, flexible strip 208 of air-impervious material can be heat-sealed, or otherwise bonded, to the lower edge 218 of an elongated, flexible strip 216 of air-impervious material; and the upper edge 212 of the strip 208 can be heat-sealed, or otherwise bonded, to the upper edge 202 of the strip 216. If desired, the upper edges 212 and 220 could be made short in height; and, in that event, they would primarily act to seal the upper edge of the elongated, flexible, inflatable tube which is defined by the bonded strips 208 and 216. However, it usually will be desirable to make the upper edges 212 and 220, respectively, of the strips 208 and 216 high enough to enable them to act as a barrier as well as to seal the upper edge of the elongated, flexible, inflatable tube which is defined by the bonded strips 208 and 216.

The mid-portions 214 and 222, respectively, of the strips 208 and 216 will be free to move relative to each other; and they will respond to the introduction of a compressed gas into the space between them to bow outwardly to assume the configuration of FIG. 17. When those mid-portions have been so bowed out, they will serve as the walls of an elongated, flexible inflatable tube which will be similar to the elongated, flexible inflatable tube 16 or to the elongated, flexible inflatable tube 162. In addition, when the mid-portions 214 and 222 are bowed out as shown by FIG. 17, they will cause the upper edges 212 and 220 to incline upwardly and inwardly at an angle of about forty-five degrees. This means that when the mid-portions 214 and 222 are bowed out as shown by FIG. 17, the tube which is formed by the strips 208 and 216 will be buoyant and will have an upwardly and inwardly-inclined barrier at the upper surfaces thereof.

The numeral 224 denotes a net which has the upper edge thereof sewn or otherwise secured to the lower edges 210 and 218, respectively, of the strips 208 and 216. That net can be identical in most respects to the net 10, to the net 160, to the net 180 or to the net in FIGS. 15 and 16; but it will not have a tube-receiving heading at the upper edge thereof. The securement of the upper edge of the net 224 to the lower edges 210 and 218, respectively, of the strips 208 and 216, will help hold the upper edges 212 and 220 of those strips inclined upwardly and inwardly relative to the upper surface of the elongated, flexible inflatable tube which is defined by those strips.

If desired, the containers 150 and 154, and any additional containers that are disposed within the space defined by the net 10, can be equipped with switches like the switch 136. Where that is done, and where those switches and the switch 136 are connected in series relation, all of the containers 134, 150 and 154 will have to be substantially empty before the solenoid 82 can be energized. By requiring all three of the containers 134, 150 and 154 to be substantially empty before the solenoid 82 can be energized, it is possible to keep a few fish adjacent the container 134 from causing that solenoid to be energized.

Whereas the drawing and accompanying description have shown and described several preferred embodiments of the present invention, it should be apparent to those skilled in the art that various changes may be made in the form of the invention without affecting the scope thereof.

What I claim is:

1. A seine-type fishing net which is disposable within a body of water to catch fish and which has an elongated, inflatable tube secured thereto adjacent the upper edge thereof, a plurality of weights secured to said seine-type fishing net below the level of said upper edge of said seine-type fishing net, and a valve for said elongated, inflatable tube, said elongated, inflatable tube being so dimensioned that the inflation thereof by a gas will render said elongated, inflatable tube sufficiently buoyant to hold said upper edge of said seine-type fishing net adjacent the surface of said body of water, said elongated, inflatable tube being readily kinkable so the application of a kinking force to said elongated, inflatable tube can form an air-blocking kink in said elongated, inflatable tube and thereby enable said elongated, inflatable tube to have a portion thereof selectively deflatable while a contiguous portion thereof remains at least partially inflated, the first said portion of said elongated, inflatable tube being deflatable to enable the adjacent portion of said upper edge of said seine-type net to sink below said surface of said body of water, said contiguous portion of said elongated, inflatable tube remaining at least partially inflated to hold the contiguous portion of said upper edge of said seine-type fishing net adjacent said surface of said body of water, said valve selectively permitting gas to enter said elongated, inflatable tube and fully inflate said first said portion of said elongated, inflatable tube and thereby enable said first said portion of said elongated, inflatable tube to cause said adjacent portion of said upper edge of said seine-type fishing net to approach said surface of said body of water, said elongated, inflatable tube being flexible to enable said seine-type fishing net to be used as a seine to confine and hold fish within progressively reduced areas in said body of water.

2. A seine-type fishing net as claimed in claim 1 wherein a further plurality of weights is secured to said seine-type fishing net above the level of the first said plurality of weights, and wherin the cumulative value of the weights in said further plurality of weights which are in register with and which apply downwardly-acting forces to said portion of said elongated, inflatable tube is greater than the cumulative value of the weights in said further plurality of weights which are in register with and which apply downwardly-acting forces to an adjacent portion of said elongated, inflatable tube, whereby the buoyancy of said portion of said elongated, inflatable tube is overcome and said portion of said elongated, inflatable tube will sink below said surface of said body of water before the buoyancy of said adjacent portion of said elongated inflatable tube can be overcome and said adjacent portion of said elongated, inflatable tube can sink below said surface of said body of water as gas is released from said elongated, inflatable tube.

3. A seine-type fishing net which is disposable within a body of water to catch fish and which has an elongated, inflatable tube secured thereto adjacent the upper edge thereof, a plurality of weights secured to said seine-type fishing net below the level of said upper edge of said seine-type fishing net, and a valve for said elongated, inflatable tube, said elongated, inflatable tube being so dimensioned that the inflation thereof by a gas will render said elongated, inflatable tube sufficiently buoyant to hold said upper edge of said seine-type fishing net adjacent the surface of said body of water, said elongated, inflatable tube being readily kinkable so the application of a kinking force to said elongated, inflatable tube can form an air-blocking kink in said elongated, inflatable tube and thereby enable said elongated, inflatable tube to have a portion thereof selectively deflatable while a contiguous portion thereof remains at least partially inflated, the first said portion of said elongated, inflatable tube being deflatable to enable the adjacent portion of said upper edge of said seine-type fishing net to sink below said surface of said body of water, said contiguous portion of said elongated inflatable tube remaining at least partially inflated to hold the contiguous portion of said upper edge of said seine-type fishing net adjacent said surface of said body of water, said valve selectively permitting gas to enter said elongated, inflatable tube and fully inflate said first said portion of said elongated, inflatable tube and thereby enable said first said portion of said elongated, inflatable tube to cause said adjacent portion of said upper edge of said seine-type fishing net to approach said surface of said body of water, said elongated, inflatable tube being flexible to enable said seine-type fishing net to be used as a seine to confine and hold fish within progressively-reduced areas in said body of water, said plurality of weights being located close to but being spaced a short distance above the lower edge of said seine-type fishing net, the short-height portion of said seine-type fishing net which is intermediate said plurality of weihts and said lower edge of said seine-type fishing net being readily flexible so it can rest upon and can conform to the bottom of said body of water and thereby resist the efforts of fish to raise and pass under said plurality of weights, said seine-type net having an open bottom.

4. A seine-type fishing net as claimed in claim 1 wherein said seine-type fishing net has an open bottom, wherein said seine-type fishing net is dimensioned to have the lower edge thereof rest upon the bottom of said body of water, and wherein an elongated, flexible, tensile element is disposed adjacent said plurality of weights and is usable to pull said plurality of weights and hence said lower edge of said seine-type fishing net inwardly toward the bank of said body of water.

5. A seine-type fishing net as claimed in claim 1 wherein points spaced along the length of said elongated, inflatable tube can be kinked to prevent the movement of air through said elongated, inflatable tube at said point and can thereby trap air within spaced apart lengths of said elongated, inflatable tube.

6. A seine-type fishing net as claimed in claim 1 wherein a point on said elongated, inflatable tube can be kinked to prevent the movement of air through said elongated, inflatable tube at said point and can thereby isolate the gas within one portion of said elongated, inflatable tube from an adjacent portion of said elongated, inflatable tube and to permit said adjacent portion of said elongated, inflatable tube to be submerged below said surface of said body of water, and wherein a further point on said elongated, inflatable tube at the other end of said adjacent portion of said elongated, inflatable tube can be kinked to prevent the movement of air through said elongated, inflatable tube at said further point and can thereby isolate said adjacent portion of said elongated, inflatable tube from the gas within a further portion of said elongated, inflatable tube, whereby the first said and said further portions of said elongated, inflatable tube can remain buoyant while said adjacent portion of said elongated, inflatable tube remains submerged below said surface of said body of water.

7. A seine-type fishing net as claimed in claim 1 wherein points spaced along the length of said elongated, inflatable tube can be kinked to prevent the movement of air through said elongated, inflatable tube at said point and can thereby trap air within spaced apart portions of said elongated, inflatable tube, and wherein said points are spaced away from both ends of said seine-type fishing net.

8. A seine-type fishing net which is disposable within a body of water to catch fish and which has an elongated, inflatable tube secured thereto adjacent the upper edge thereof, said elongated, inflatable tube being so dimensioned that the inflation thereof by a gas will render said elongated, inflatable tube sufficiently buoyant to hold said upper edge of said seine-type fishing net adjacent the surface of said body of water, said elongated, inflatable tube being readily-kinkable so the application of a kinking force to a point thereon will cause said point to become kinked to prevent the movement of air through said elongated, inflatable tube at said point and will thereby enable said kinked point to isolate the gas within one portion of said elongated, inflatable tube from an adjacent portion of said elongated, inflatable tube and to permit said adjacent portion of said elongated, inflatable tube to be submerged below said surface of said body of water, wherein the application of a kinking force to a further point on said elongated, inflatable tube at the other end of said adjacent portion of said elongated, inflatable tube can cause said further portion to become kinked to prevent the movement of air through said elongated, inflatable tube at said further point and can thereby isolate said adjacent portion of said elongated, inflatable tube from the gas within a further portion of said elongated, inflatable tube, whereby the first said and said further portions of said elongated, inflatable tube can remain buoyant while said adjacent portion of said elongated, inflatable tube remains submerged below said surface of said body of water, and wherein both the first said and said further points on said elongated, inflatable tube are spaced away from both ends of said seine-type fishing net.

9. A seine-type fishing net which is disposable within a body of water to catch fish and which has an elongated, inflatable tube secured thereto adjacent the upper edge thereof, a plurality of weights secured to said seine-type fishing net below the level of said upper edge of said seine-type fishing net, and a valve for said elongated, inflatable tube, said elongated, inflatable tube being so dimensioned that the inflation thereof by a gas will render said elongated, inflatable tube sufficiently buoyant to hold said upper edge of said seine-type fishing net adjacent the surface of said body of water, said elongated, inflatable tube being readily kinkable so the application of a kinking force to said elongated, inflatable tube can form an air-blocking kink in said elongated, inflatable tube and thereby enable said elongated, inflatable tube to have a portion thereof selectively deflatable while a contiguous portion thereof remains at least partially inflated, the first said portion of said elongated, inflatable tube being deflatable to enable the adjacent portion of said upper edge of said seine-type fishing net to sink below said surface of said body of water, said contiguous portion of said elongated, inflatable tube remaining at least partially inflated to hold the contiguous portion of said upper edge of said seine-type fishing net adjacent said surface of said body of water, said valve selectively permitting gas to enter said elongated, inflatable tube and fully inflate said first said portion of said elongated, inflatable tube and thereby enable said first said portion of said elongated, inflatable tube to cause said adjacent portion of said upper edge of said seine-type fishing net to approach said surface of said body of water, said elongated, inflatable tube being flexible to enable said seine-type fishing net to be used as a seine to confine and hold fish within progressively-reduced areas in said body of water, an electrically-controlled means that is connected to said valve and that can effect opening of said valve to cause inflation of said portion of said elongated, inflatable tube, a switch that is mounted on a feed pan that is disposed within said body of water and that is encircled by said seine-type fishing net, said switch not permitting actuation of said electrically-controlled means as long as said feed pan is filled, and said switch permitting actuation of said electrically-controlled means when said feed pan is emptied.

10. A seine-type fishing net as claimed in claim 1 wherein one end of said seine-type fishing net is securable to a stationary support on the bank adjacent said body of water, wherein the other end of said seine-type net is securable to a further stationary support on said bank adjacent said body of water, wherein said plurality of weights is located close to, but a short distance above, the lower edge of said seine-type fishing net, wherein a plurality of elongated, flexible, tensile elements are connected to said seine-type fishing net at points which are intermediate the level of said upper edge of said seine-type fishing net and the lower edge of said seine-type fishing net and close to the level of said plurality of weights, and wherein said elongated, flexible, tensile elements can be used to pull the lower portion of said seine-type fishing net toward said bank.

11. A seine-type fishing net as claimed in claim 1 wherein said seine-type fishing net has an open bottom, wherein said seine-type fishing net is dimensioned to have the lower edge thereof rest upon the bottom of said body of water, wherein an elongated, flexible, tensile element is secured to said seine-type fishing net below the level of said upper edge of said seine-type fishing net and extends generally lengthwise of said seine-type fishing net, wherein a plurality of elongated, flexible, tensile elements have the outer ends thereof connected to said seine-type fishing net at points adjacent the first said elongated, flexible, tensile element and have the inner ends thereof extending inwardly of said bank of said body of water, and wherein said plurality of elongated, flexible, tensile elements can be used to pull the lower portion of said seine-type fishing net toward the bank of said body of water.

12. A seine-type fishing net which is disposable within a body of water to catch fish and which has an elongated, inflatable tube secured thereto adjacent the upper edge thereof, a plurality of weights secured to said seine-type fishing net below the level of said upper edge of said seine-type fishing net, and a valve for said elongated, inflatable tube, said elongated, inflatable tube being so dimensioned that the inflation thereof by a gas will render said elongated, inflatable tube sufficiently buoyant to hold said upper edge of said seine-type fishing net adjacent the surface of said body of water, said elongated, inflatable tube being readily kinkable so the application of a kinking force to said elongated, inflatable tube can form an air-blocking kink in said elongated, inflatable tube and thereby enable said elongated, inflatable tube to have a portion thereof selectively deflatable while a contiguous portion thereof remains at least partially inflated, the first said portion of said elongated, inflatable tube being deflatable to enable the adjacent portion of said upper edge of said seine-type fishing net to sink below said surface of said body of water, said contiguous portion of said elongated, inflatable tube remaining at least partially inflated to hold the contiguous portion of said upper edge of said seine-type fishing net adjacent said surface of said body of water, said valve selectively permitting gas to enter said elongated, inflatable tube and fully inflate said first said portion of said elongated, inflatable tube and thereby enable said first said portion of said elongated, inflatable tube to cause said adjacent portion of said upper edge of said seine-type fishing net to approach said surface of said body of water, said elongated, inflatable tube being flexible to enable said seine-type fishing net to be used as a seine to confine and hold fish witin progressively-reduced areas in said body of water, said seine-type fishing net having an open bottom, said seine-type fishing net being dimensioned to have the lower edge thereof rest upon the bottom of said body of water, a plurality of elongated, flexible, tensile elements having the outer ends thereof connected to said seine-type fishing net at points which are below the level of said upper edge of said seine-type fishing net but which are a short distance above the level of the lower edge of said seine-tye fishing net, said elongated, flexible, tensile elements having the inner ends thereof extending inwardly of said bank of said body of water, and said elongated, flexible, tensile elements being usable to pull the lower portion of said seine-type fishing net toward said bank while permitting the lower edge of said seine-type fishing net to rest upon the bottom of said body of water and to trail said points to which said elongated, flexible, tensile elements are connected.

13. A seine-type fishing net which is disposable within a body of water to catch fish and which has an elongated, inflatable tube secured thereto adjacent the upper edge thereof, a plurality of weights secured to said seine-type net below the level of said upper edge of said seine-type fishing net, and a valve for said elongated, inflatable tube, said elongated, inflatable tube being so dimensioned that the inflation thereof by a gas will render said elongated, inflatable tube sufficiently buoyant to hold said upper edge of said seine-type fishing net adjacent the surface of said body of water, said elongated, inflatable tube being readily kinkable so the application of a kinking force to said elongated, inflatable tube can form an air-blocking kink in said elongated, inflatable tube and thereby enable said elongated, inflatable tube to have a portion thereof selectively deflatable while a contiguous portion thereof remains at least partially inflated, the first said portion of said elongated, inflatable tube being deflatable to enable the adjacent portion of said upper edge of said seine-type fishing net to sink below said surface of said body of water, said contiguous portion of said elongated, inflatable tube remaining at least partially inflated to hold the contiguous portion of said upper edge of said seine-type fishing net adjacent said surface of said body of water, said valve selectively permitting gas to enter said elongated, inflatable tube and fully inflate said first said portion of said elongated, inflatable tube and thereby enable said first said portion of said elongated, inflatable tube to cause said adjacent portion of said upper edge of said seine-type fishing net to approach said surface of said body of water, said elongated, inflatable tube being flexible to enable said seine-type fishing net to be used as a seine to confine and hold fish within progressively-reduced areas in said body of water, a plurality of further weights secured to said seine-type fishing net adjacent said upper edge of said seine-type fishing net said further weights having different masses, the masses of said further weights increasing progressively as the distances between said weights and one end of said elongated inflatable tube increase, said plurality of further weights determining which length of said upper edge of said seine-type fishing net is the first length of said upper edge of said seine-type fishing net to become submerged when gas is permitted to escape from said elongated, inflatable tube and also assuring progressive, substantially-complete deflation of the section of said elongated, inflatable tube to which said length of said upper edge of said seine-type fishing net is secured.

14. A seine-type fishing net which is disposable within a body of water to catch fish and which has buoyant means secured adjacent the upper edge thereof, a lead line secured to said seine-type fishing net at places which are below the level of said upper edge of said seine-type fishing net but which are a short distance above the level of the lower edge of said seine-type fishing net, and a plurality of elongated, flexible, tensile members which have the outer ends thereof secured to said lead line at spaced points along the length of said lead line, and which have the other ends thereof securable to a support on the bank adjacent said body of water, said elongated, flexible tensile members being usable to pull said lead line toward said bank as said seine-type fishing net is being used to harvest fish while permitting the lower edge of said seine-type fishing net to est upon the bottom of said body of water and to trail said spaced points to which said elongated, flexible, tensile elements are connected.

15. The method of catching fish which comprises disposing a seine-type fishing net with a normally inflated upper edge within a body of water, kinking a part of said normally inflated upper edge of said seine-type fishing net to form an air-blocking kink, partially deflating at least a portion of said normally-inflated upper edge of said seine-type fishing net to enable said portion of said normally inflated upper edge of said seine-type fishing net to become submerged within said body of water while keeping the contiguous portions of said normally inflated upper edge of said seine-type fishing net sufficiently buoyant to float at the surface of said body of water, and subsequently re-inflating said portion of said normally inflated upper edge of said seine-type fishing net to enable said portion of said normally inflated upper edge of said seine-type fishing net to approach said surface of said body of water.

16. The method of catching fish as claimed in claim 15 wherein said net is pulled toward the bank of said body of water by applying forces to the lower portion of said seine-type fishing net at points a short distance above the lower edge of said seine-type fishing net, said forces causing said lower portion of said seine-type fishing net to move toward said bank but permitting said lower edge of said seine-type fishing net to rest on the bottom of said body of water and to trail behind said lower portion of said seine-type fishing net.

17. A fishing net which is disposable within a body of water to catch fish and which has means to dispose the upper edge of said fishing net at the surface of said body of water to enable said fishing net to confine fish, means defining a large opening in said fishing net below the level of said upper edge of said fishing net, a door movably mounted adjacent said large opening, said door being movable inwardly of said fishing net by fish desiring to enter the space defined by said fishing net, said door blocking movement of fish outwardly of said source through said large opening, gauging elements which are secured to said fishing net and which are held in spaced apart relation to define a further opening adjacent said large opening, and said gauging elements limiting the size of fish which can pass inwardly or outwardly of said further opening.

18. A fishing net which is disposable within a body of water to catch fish and which has an elongated flexible inflatable tube secured thereto adjacent the upper edge thereof, weight means secured to said fishing net below the level of said upper edge of said fishing net, and a barrier which extends upwardly above the upper surface of said elongated flexible inflatable tube, said barrier resisting efforts of fish to rise up and pass over said upper edge of said fishing net, said barrier being flexible to permit bending of portions thereof along the length of said elongated flexible inflatable tube during the submerging of part of said upper edge of said fishing net but said barrier extending upwardly above said upper surface of said elongated flexible inflatable tube whenever all portions of said upper surface of said fishing net are at the surface of said body of water.

19. A fishing net as claimed in claim 18 wherein said barrier inclines upwardly and inwardly of said elongated, flexible inflatable tube.

20. A seine-type fishing net which is disposable within a body of water to catch fish and which has an elongated, flexible, inflatable tube secured thereto adjacent the upper edge thereof, weights means secured to said seine-type fishing net below the level of said upper edge of said seine-type fishing net, said seine-type fishing net being dimensioned so the bottom thereof can rest upon the bottom of said body of water, said elongated, inflatable tube being readily kinkable so the application of a kinking force to said elongated, inflatable tube can form an air-blocking kink in said elongated, inflatable tube and thereby enable said elongated, flexible inflatable tube to have at least one portion thereof deflatable to sink below the surface of said body of water while the contiguous portions of said elongated flexible, inflatable tube remain sufficiently buoyant to hold the portions of said upper edge of said seine-type fishing net to which they are secured at the surface of said body of water, said seine-type fishing net extending downwardly from said elongated, flexible inflatable tube to prevent the escape of fish from the area defined by said seine-type fishing net, and said elongated, flexible, inflatable tube extending upwardly above said surface of said body of water to constitute a barrier which will keep fish from jumping over it and out of said area defined by said seine-type fishing net.

* * * * *